United States Patent Office 3,433,476
Patented Mar. 18, 1969

3,433,476
APPARATUS FOR ELIMINATION OF SHEETS IN CROSS CUTTING AND SIMILAR MACHINES
Horst Baucke, Solingen-Ohligs, Germany, assignor to Jagenberg-Werke AG, Dusseldorf, Germany
Filed Jan. 13, 1967, Ser. No. 609,114
Claims priority, application Germany, Jan. 13, 1966, J 29,818
U.S. Cl. 271—64
Int. Cl. B65h 29/62
10 Claims

ABSTRACT OF THE DISCLOSURE

Generally, this invention is directed to an apparatus for the elimination of sheets in cross cutting machines of the type in which the sheets are moved in a forward direction between endless conveying means and means movable into operative relation to the conveying means serves to deflect the sheets from their forward direction of movement, the movable means comprising individual deflecting fingers arranged in side-by-side relationship and means cooperable with the fingers for selectively combining the fingers in determinable operable groups.

---

Figure 1A:
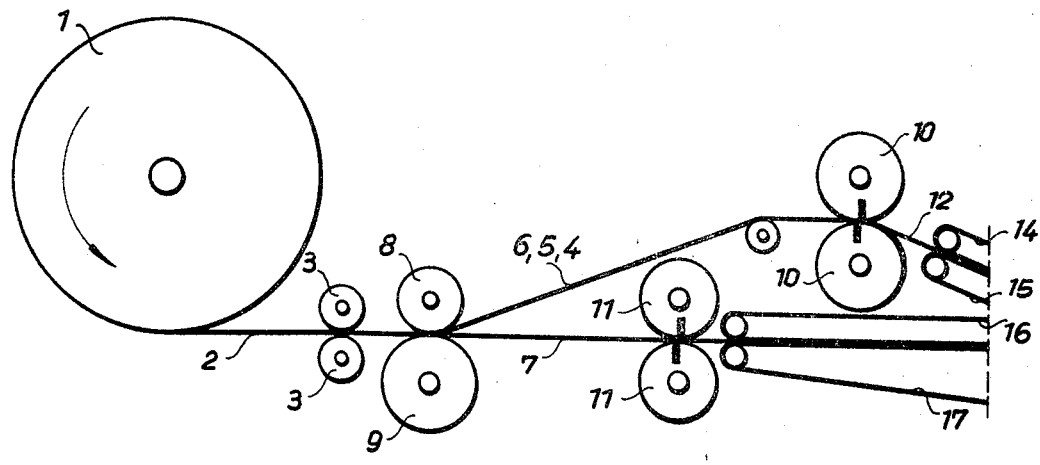

The present invention relates to paper processing equipment and more particularly to an apparatus for the elimination of faulty defective sheets in cross cutters or other machines of the type in which the sheets are moved in a forward direction between endless conveyor belts and are, by the assistance of means moving into the path of conveying or movement, deflecting from the original direction of movement of such sheets.

Generally, eliminators for defective sheets in such equipment are controlled by optical or electronic defect seeking means in such a fashion that the sheet containing the fault or defect is always ejected or discarded and such defective sheets are thereafter deposited onto a special stack. The arrangement of the deflecting means has further been such than an entire width of the web of the material is eliminated so that when such deflecting means are utilized in conjunction with the so-called double cross cutters, that is to say cross cutters provided with two cutting devices which are separated from each other in the axial direction, such mode of operation leads to considerable problems, since each of the two cross cutting means sever sheets of different length and as a consequence, the position of the front and rear edges respectively of the sheets varies. However, an orderly elimination at the front can only occur provided the front and rear edges respectively of the sheets are in the same position, since otherwise a buckling or tearing of such sheets which have not yet attained with their front or rear edges respectively, the deflecting means when such means becomes operative have already left the effective zone or area of the deflecting means.

To overcome the aforementioned difficulties, it has been proposed to utilize an apparatus in which the deflecting means is constituted by components so arranged as to provide a divided assemblage in which the two components are actuable separately and each component is operably related to one cross cutting means. As a consequence, each component of the deflecting means can be actuated at the correct moment so to speak, relative to the corresponding front and rear edges respectively of the sheets. The disadvantage of the aforementioned type of apparatus resides in the fact that with such apparatus, only two selected widths of a paper web can be processed, since a changing or altering of the effective width of both components constituting the deflecting means is not possible.

To eliminate such difficulties is a salient object of the present invention which in effect provides a deflecting means by means of which the separating line which has reference to the processing width can be adjusted for any desired location.

More specifically, according to the present invention, the deflecting means is such that it includes a plurality of individual deflecting fingers arranged in side-by-side relationship and which fingers can be combined into selectively determined operative groups. For accomplishing the foregoing, there are provided follower means which coact or combine with the deflecting fingers to provide the respectively desired groups, as well as actuate such groups and each group is operably related with one follower.

With the specific embodiment illustrated, two followers actuate the respectively associated groups independently of each other and each deflecting finger is equipped with two rollers, one of which is connected in a locking relationship with a follower, with such followers including recessed slide tracks in which the rollers are disposed to be slidable transversely with respect to the direction of movement of the paper.

The recessed slide track in the followers are so disposed that the recessed portion of one component is positioned opposite the non-recessed portion of the other component and the recessed portion of the other component and the recessed areas of the component are of varying widths. Moreover, the arrangement is such that the recessed areas in one component become greater from one side in the direction toward the middle and the recessed areas of the other component become smaller from the same side in the direction toward the middle with the width of the smallest part of the recessed area corresponding to the width of a roller. In addition, each subsequent recess is greater by the width of one roller than the preceding recessed part.

Accordingly, one specific object of the invention is to provide screw-actuated, bodily, laterally shiftable means mounted below and cooperable with the deflecting fingers for selectively combining the fingers in determinable operable groups.

Figure 2A:
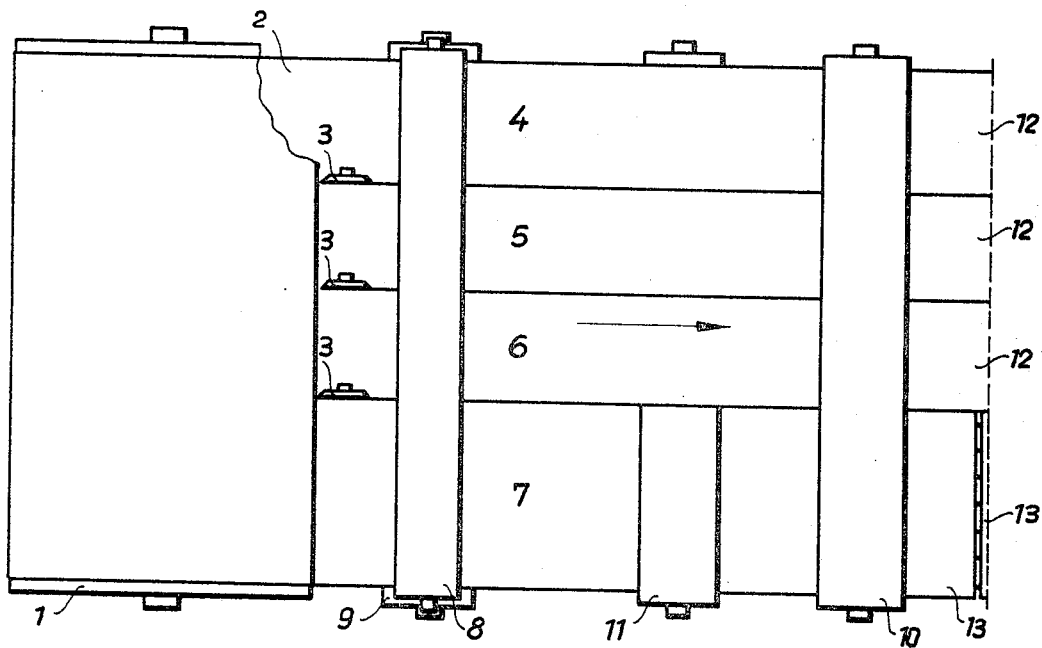
Figure 1B:
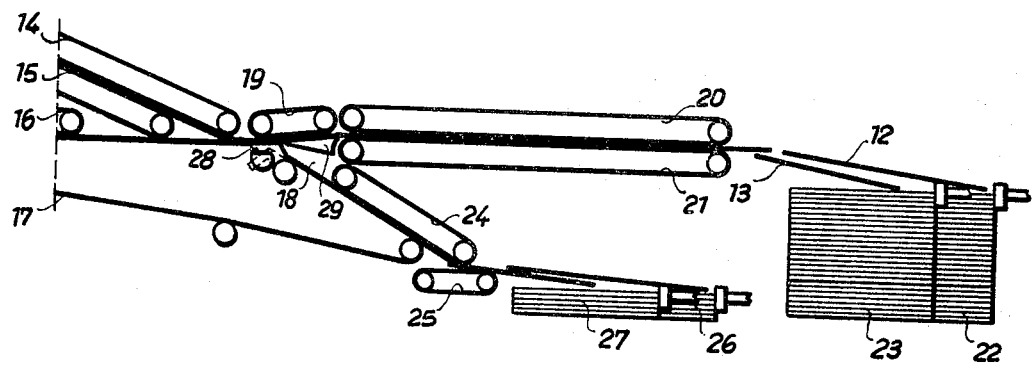
Figure 2B:
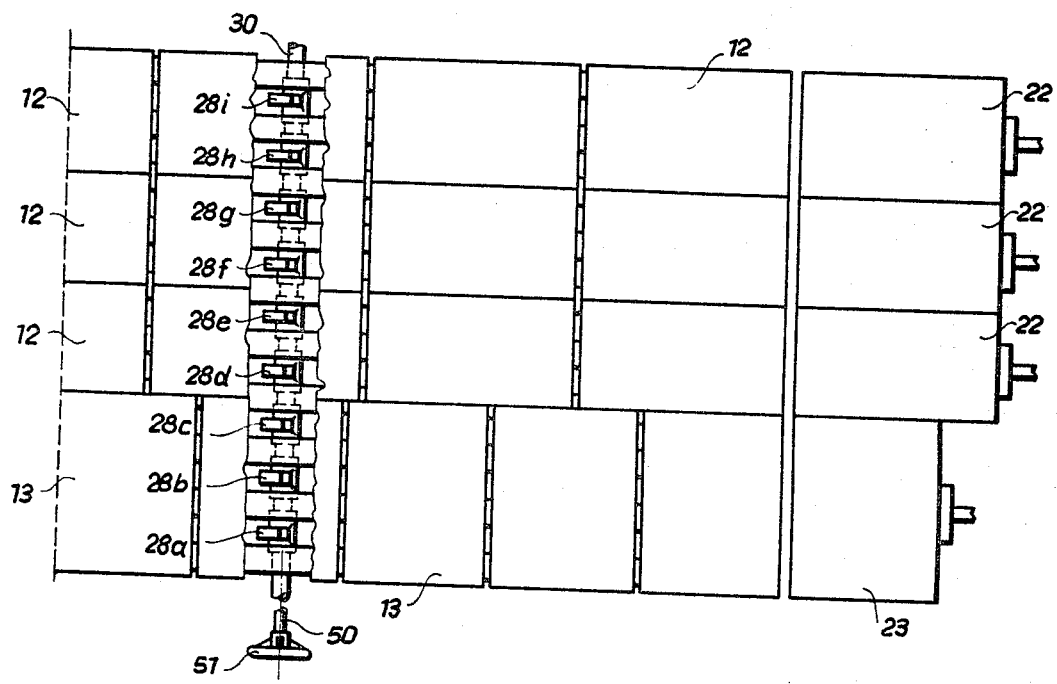
Figure 3A:
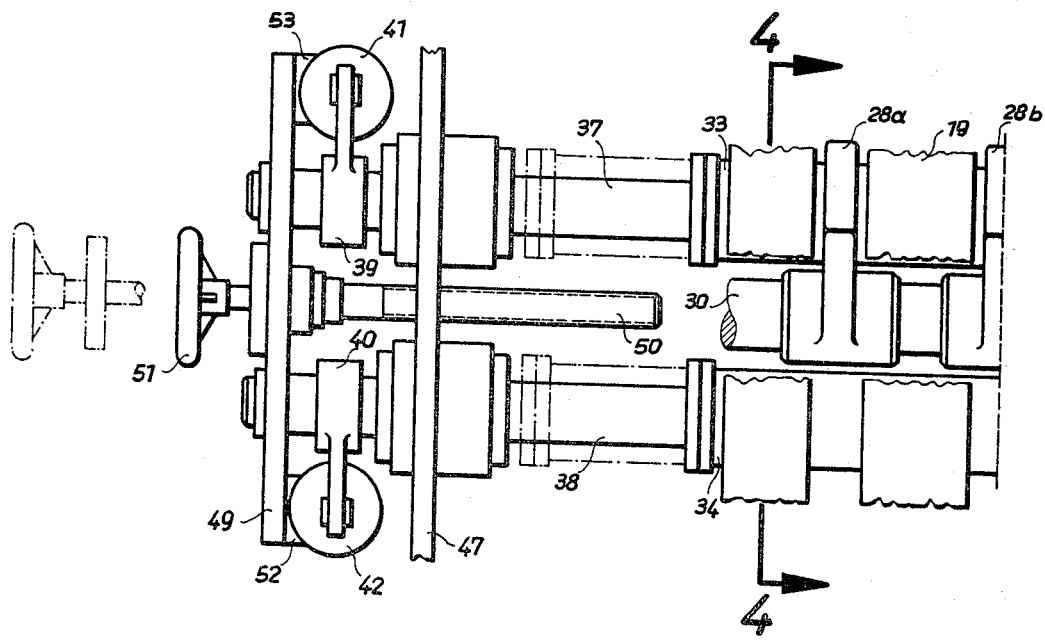
Figure 3B:
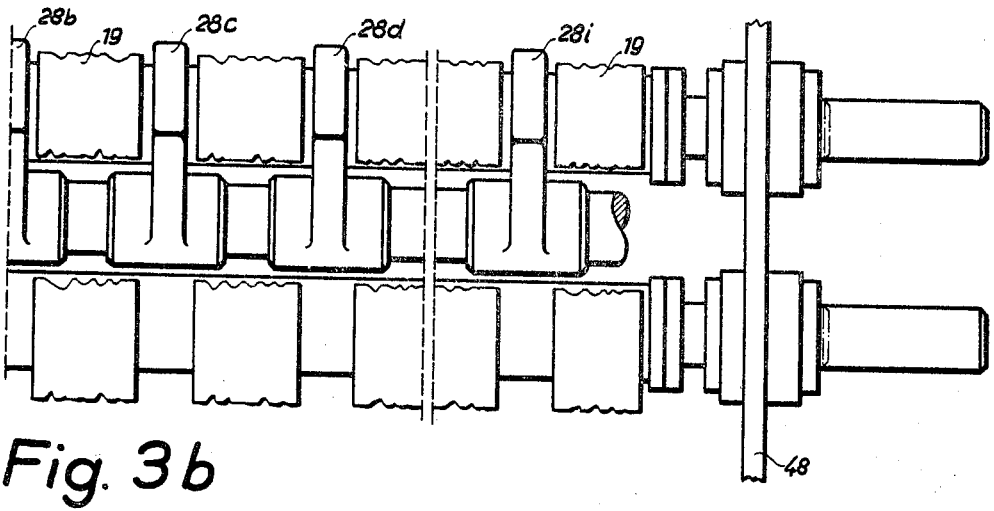
Figure 7:
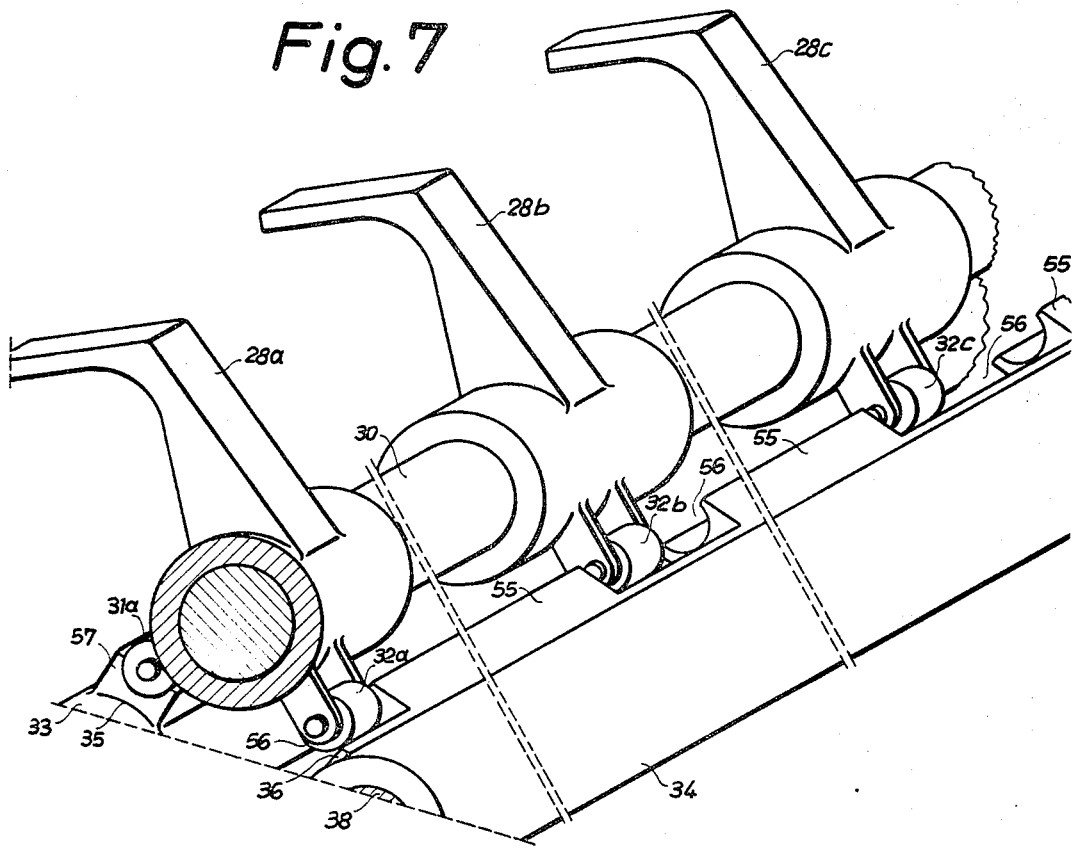
Figure 4:
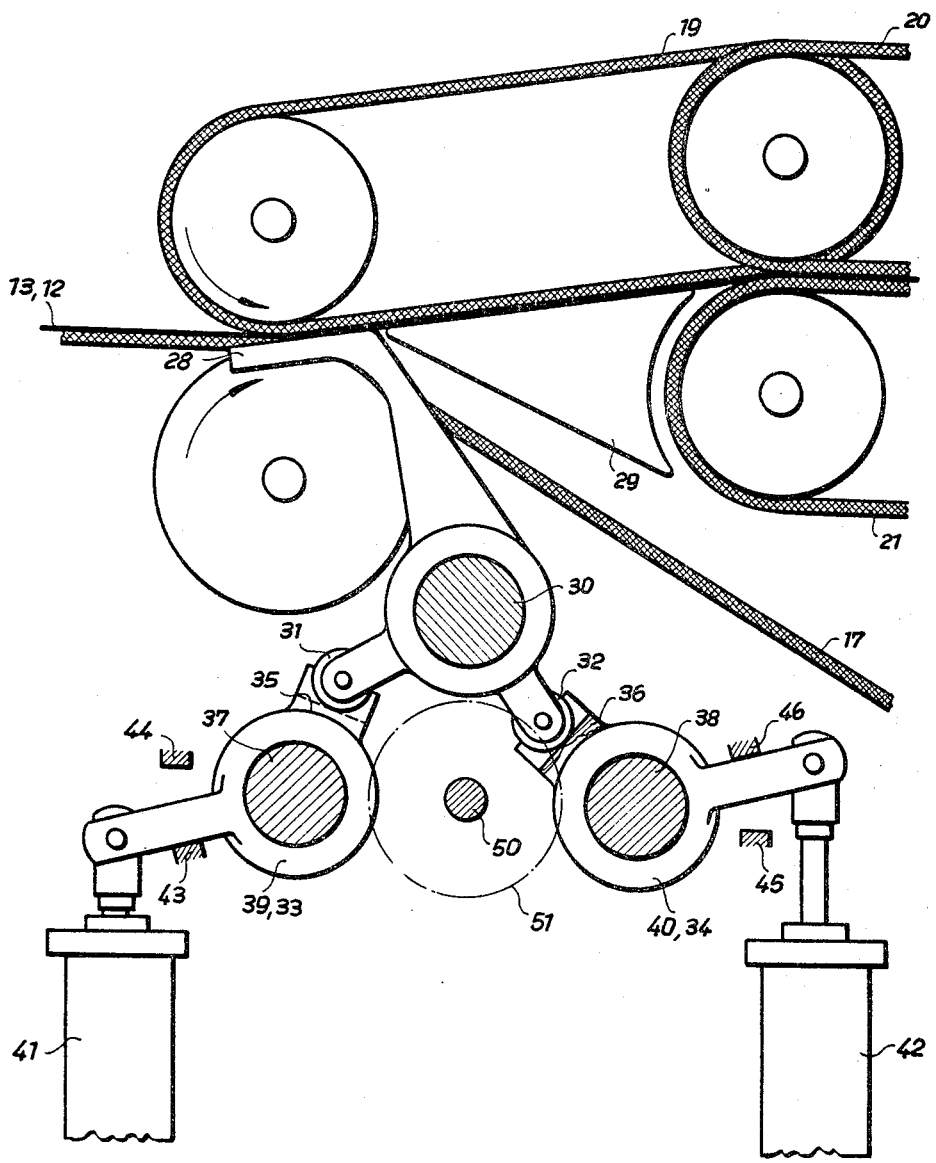
Figure 5:
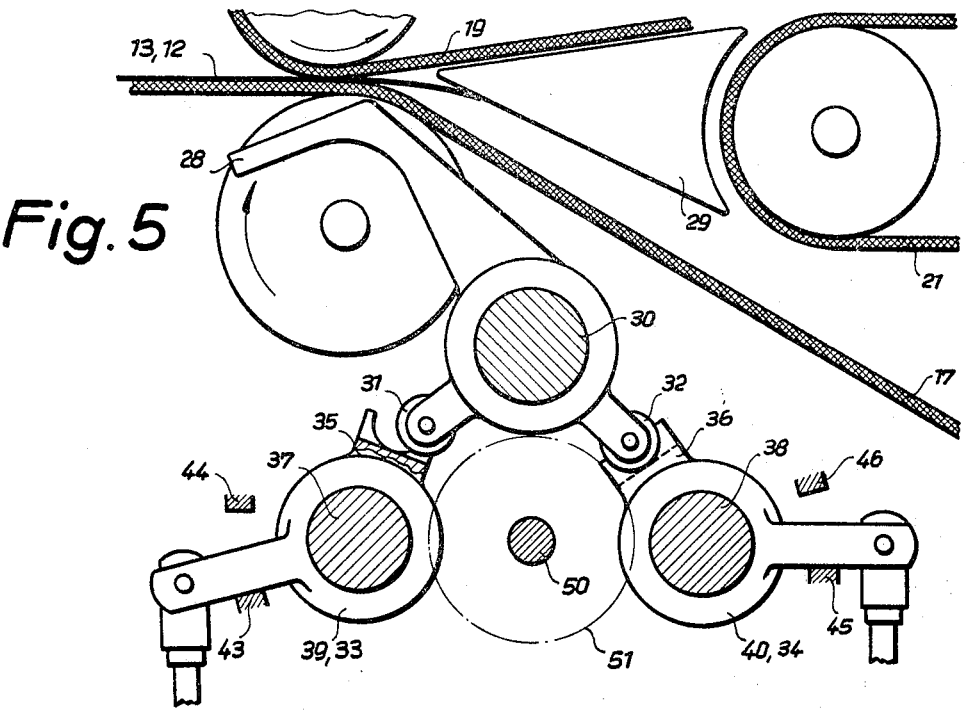
Figure 6:
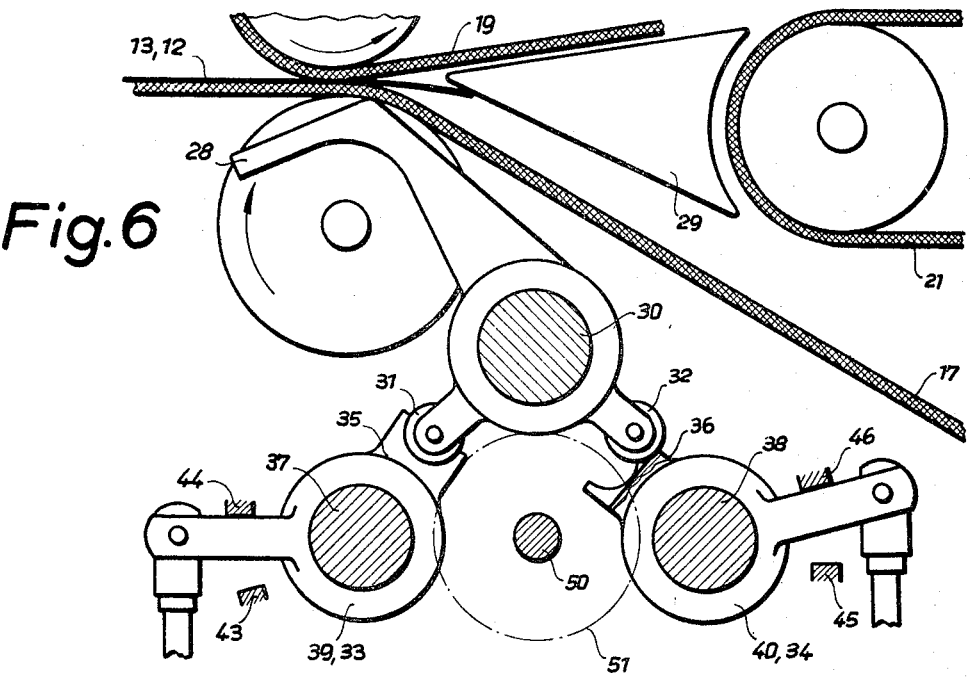

Further important objects and advantages of the present invention become more readily apparent to persons skilled in this particular art from the ensuing detailed specification and annexed drawings, and in which drawings:

FIGURES 1a and 1b are a diagrammatic side view of a cross cutter embodying the present invention, FIGURES 2a and 2b are a top plan view of the arrangement shown in FIGURE 1, FIGURES 3a and 3b are a top plan view illustrating the deflecting fingers in accordance with the present invention, FIGURE 4 is a view taken along the line 4—4 of FIGURE 3a shown in the direction of the arrows, FIGURES 5 and 6 illustrate respectively sectional views similar to FIGURE 4 but showing a different position of deflecting fingers, FIGURE 7 is a fragmentary view in perspective of a portion of the actuating means and the deflecting fingers, FIGURES 8a and 8b–11a and 11b disclose diagrammatic views illustrating various possibilities of group combinations of the deflecting fingers.

Referring particularly to FIGURES 1a, 1b and 2a, 2b, there is disclosed a cross cutting machine of the type generally referred to as a double cross cutter and such machines include two cross cutting mechanisms spaced from each other in the axial direction of web feed in order to sever sheets of varying length from strips of a main web that has previously been subjected to a longitudinal cut or cuts. More particularly, a supply roll 1 is provided with a paper web 2 and which web 2 is withdrawn from the supply roll 1 and subdivided or severed by means of longitudinal slitter knives 3 into a plurality of webs or strips 4–7 of varying widths and which webs are conducted or led by means of transversely positioned feed rollers 8 and 9 to cross cutting assemblies 10 and 11.

More particularly, it will be noted that the cross cutting assembly 10 severs the webs 4, 5 and 6, while the cross cutting assembly 11 severs the web 7. As perhaps best shown in FIGURES 2a, 2b, the ultimate results of this arrangement of the cross cutting assemblies 10 and 11 are sheets 12 and 13 of different lengths. Following the cross cutting, the sheets 12 which, of course, are severed by the cross cutting assembly 10 are by means of endless conveyor belts 14 and 15 again moved into a plane defined by endless conveyor belts 16 and 17, in which plane the sheets 13 severed by the cross cutting assembly 11 are moved in a forward direction or towards the right as disclosed in FIGURES 1a, 1b. Upon further forward movement, these sheets 12 and 13 reach either by means of a deflecting means 18 in conjunction with endless conveyor belts 19, 20 and 21, stacks 22 and 23 or by endless conveyor belts 17, 24 and 25 discard stacks 26 and 27.

With reference to FIGURES 3a, 3b–7 the deflection means 18 essentially includes rotatably mounted deflection fingers 28 and a fixed guide member 29 in which such guide member is provided with guiding surfaces serving as guides for the sheets 12 and 13. The fingers 28 are mounted in a freely rotatable manner on a shaft or axle 30 and are provided with ears in which are supported rollers 31 and 32. The rollers 31 and 32 in turn are connected in a form-locking fashion with followers 33 and 34 by means of recessed guide tracks 35 and 36. The followers 33 and 34 are fixedly secured with shafts 37 and 38, on which shafts are also mounted levers 39 and 40 and which levers can be actuated by piston and cylinder assemblies 41 and 42 respectively. In order to limit the movement of the levers 39 and 40 stops 43, 44 and 45 and 46 are provided. The shafts 37 and 38 and thus the associated followers and guide tracks are mounted for lateral shifting in machine frame work components 47 and 48 as illustrated in FIGURE 3. In order to effect such lateral shifting, there is included a plate 49, in which plate the shafts 37 and 38 which extend or project beyond the framework 47 are also mounted. The plate 49 is additionally equipped with a threaded spindle 50 having at its outer end a hand wheel 51 and by means of rotation of the hand wheel, the shafts 37 and 38 can be shifted laterally with respect to the framework 47. In addition, the plate 49 is further provided with lugs or supports 52 and 53 for mounting the piston and cylinder assemblies 41 and 42 respectively.

While the mode of operation of the present invention is believed to be readily apparent, it may be summarized as follows:

The initial step is the adjustment of the knives 3 which severe the web 2 longitudinally in order to determine the proper width of the webs, such as denoted at 5–7. In view of the fact that in the present machine there are provided two cross cutting means independently of each other, it is feasible to sever from the same paper web 2 two sets of sheets of different lengths. For this purpose, the webs 4, 5 and 6 which are to be severed into sheets 12 having the same length, are led to the cross cutting means 10 while the web 7 which is to be severed into sheets 13 having a length different from that of sheets severed from the webs 4–6 is led to the cross cutting means 11. Depending upon the longitudinal cut between the longer and the shorter sheets, the fingers 28 must be combined into groups in such a fashion that a separate elimination independent of each other of faulty sheets severed by the respective cross cutting means 10 and 11 can be effected. The determination or location so to speak, of the faulty or defective sheet is accomplished by electronic or optical fault or defect determining means (not shown) which scan the webs 2 prior to the cutting longitudinally by the cutters 3 and which, of course, are, in a known manner connected via suitable delaying action with the actuating means for the deflecting fingers so that only the sheet or sheets containing the defect or fault is or are eliminated. Inasmuch as the different lengths of web wtih respect to the width of the web result in different positions of the front and rear edges respectively of the sheets, the elimination of a complete web width will result in problems and disadvantages as regarding tearing of the sheets to be eliminated.

Figure 10A:
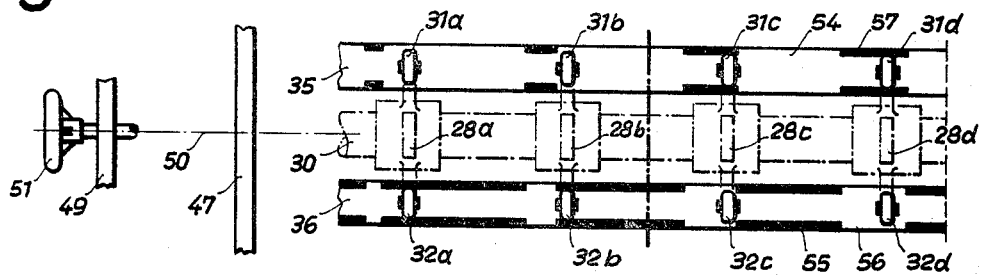
Figure 11A:
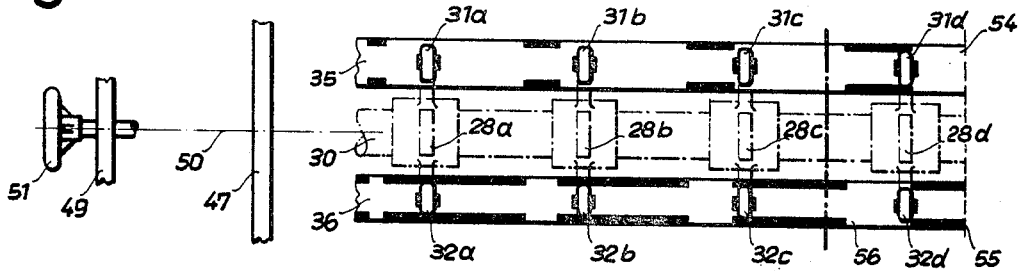
Figure 10B:
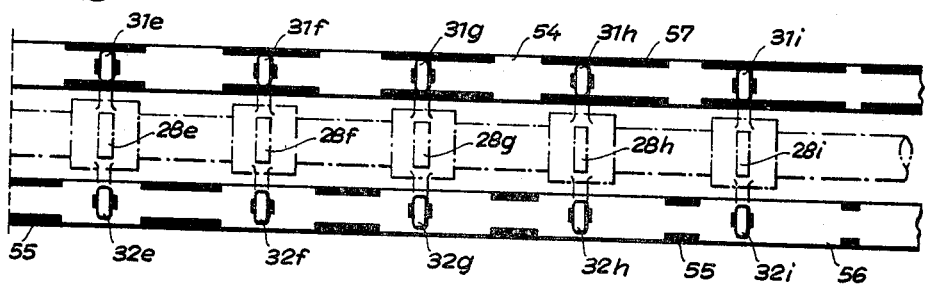
Figure 11B:
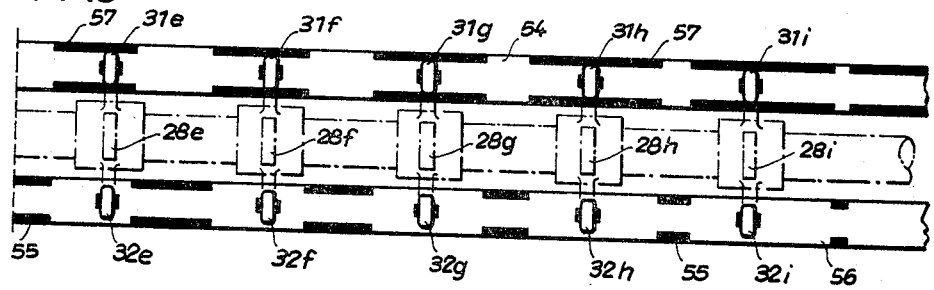

With reference to FIGURES 2a, 2b and also FIGURES 11a, 11b, the arrangement has been made that for the sheets 13, deflecting fingers 28a–28c constitute an operable group actuable together, while for sheets 12 fingers 28d–28i constitute an operable actuable group associated together. The combining of the fingers 28 into such individual groups is achieved by a shifting of the shafts 37 and 38 via manipulation of hand wheel 51 attached to the spindle 50. With a turning of the hand wheel 51, the followers 33 and 34 and as a consequence, tracks 35 and 36 are shifted laterally which results in an actuating possibility of one group by means of the track 35 and of the other group by track 36 which is perhaps best seen in FIGURES 5, 6 and 8a, 8b–11a, 11b. The aforementioned different actuating possibilities are accomplished as follows. The tracks 35 and 36 are so constructed that there is opposed to a recess zone or area 54 of the track 35 (FIGURES 8a, 8b–11a, 11b) a non-recess zone or area 55 in the track 36 and to recess zone or area 56 in track 36 a non-recessed zone or area 57 in track 35. In addition, the arrangement is such that the recessed zones or areas 54 become smaller stepwise by approximately the width of the roller 31 in a direction from the machine framework 47 toward the machine framework 48. The zones or areas 56 of the track 36 each become greater by a width of the roller 32 in a direction from the framework 47 toward the framework 48.

Figure 8A:
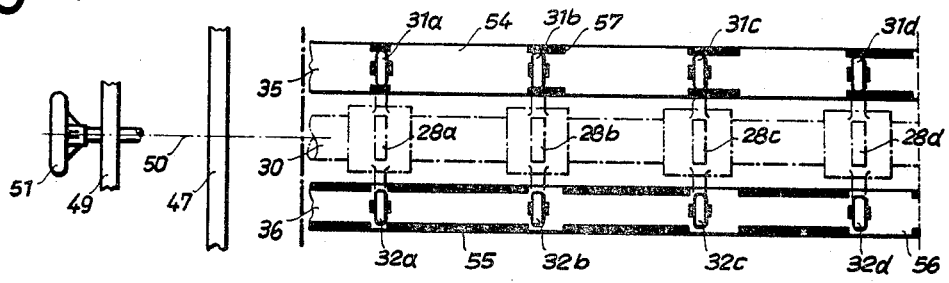
Figure 9A:
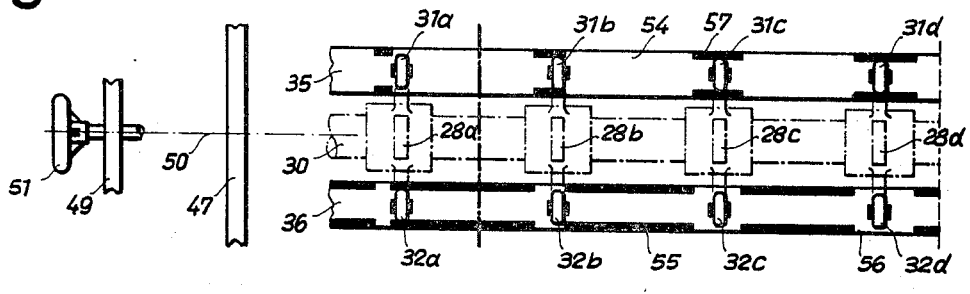
Figure 8B:
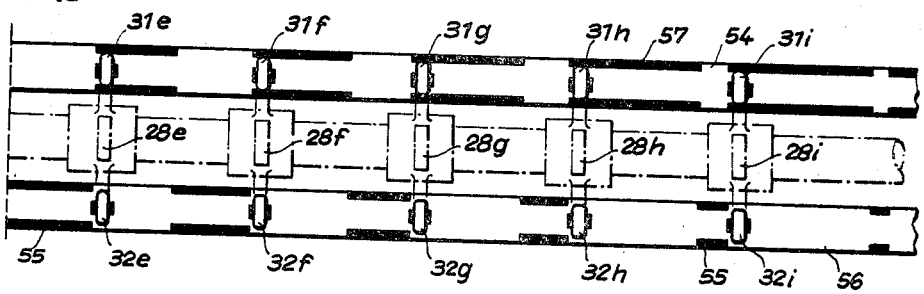
Figure 9B:
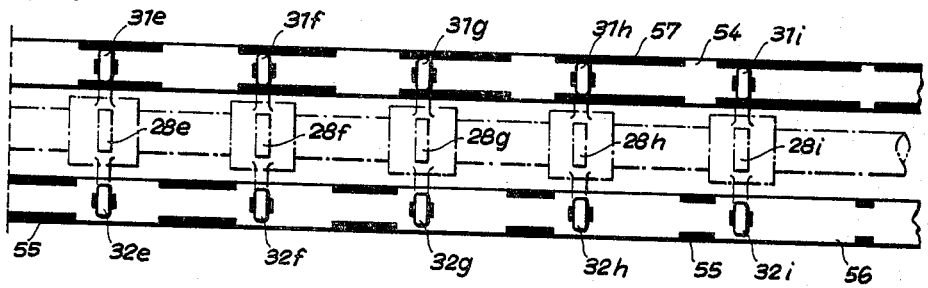

Starting from the arrangement shown in FIGURES 8a, 8b in which all fingers 28a–28i are actuated by track 35 since in such a situation rollers 31a–31i are located in the non-recessed zones or areas 57 of the track 35, while rollers 32a–32i are located in recessed zones or areas 56 of the track 36, the roller 31a is in FIGURE 9a by virtue of the shifting of the tracks 35 and 36 to a degree of one roller width positioned in a non-recessed zone or area 54 of the track 35. Simultaneously, the roller 32a located opposite the roller 31a has been moved from a recessed zone or area 56 into a non-recessed zone or area 55 of the track 36. Hence, in such a situation, the finger 28a provided with rollers 31a and 32a is actuated by the track 35 while the remaining fingers 28b and 28i are connected with the track 35.

As perhaps best illustrated in FIGURES 10a, 10b and 11a, 11b, it can be seen how by a further shifting of tracks 35 and 36 to a degree corresponding to one roller width, the fingers 28 are combined at the various groups. In FIGURES 10a, 10b, the fingers 28a and 28b are actuated by the track 36 and the fingers 28c–28i by the track 35, whereas in FIGURES 11a, 11b, the fingers 28a–28c constitute one group and the fingers 28d–28i the other group. By virtue of a further respective shifting between the tracks 35 and 36, varied groups may be assembled in order that any desired width of web can be accommodated.

The arrangement can further be such that the hand wheel 51 has incorporated therewith means for permitting the shifting of the tracks 35 and 36 only to the degree of one complete roller width in order that not both rollers 31 and 32 of a finger 28 can be in engagement at the same time with both tracks 35 and 36. The operation of the cylinders 41 and 42 may be achieved by means (not shown) in dependence upon the fault or defect detecting means previously mentioned which means have not been specifically illustrated.

What is claimed is:

1. An apparatus for the elimination of sheets in cross-cutting machines of the type in which the sheets are moved in a forward direction between endless conveying means and means movable into operative relation to the conveying means serve to deflect the sheets from their forward direction of movement, said movable means including a plurality of individual deflecting fingers arranged in side-by-side relationship, and bodily laterally shiftable means mounted below and cooperable with the fingers for movement transversely of the direction of sheet feed for selectively combining the fingers in determinable operable groups.

2. The apparatus as claimed in claim 1 in which said last-mentioned means includes followers that selectively combine the fingers into determinable operable groups and actuate the operable groups.

3. The apparatus as claimed in claim 2 in which a follower is operably related with each operable group.

4. Apparatus for the elimination of sheets in cross-cutting machines of the type in which the sheets are moved in a forward direction between endless conveying means and means movable into operative relation to the conveying means serve to deflect the sheets from their forward direction of movement, said movable means including a plurality of individual deflecting fingers arranged in side-by-side relationship, and follower means cooperable with the fingers for selectively combining the fingers in determinable operable groups, said follower means including a follower operably related with each operable group, there being at least two followers operably related with at least two operable groups for actuating the groups independently of each other.

5. Apparatus for the elimination of sheets in cross cutting machines of the type in which the sheets are moved in a forward direction between endless conveying means and means movable into operative relation to the conveying means serve to deflect the sheets from their forward direction of movement, said operable means including a plurality of individual deflecting fingers arranged in side-by-side relationship, and means cooperable with the fingers for selectively combining the fingers in determinable operable groups including two rollers associated with each finger, said rollers being arranged in two sets of rollers, a follower for each set of rollers and means operably connecting one roller of each finger with one of the respective followers therefor.

6. The apparatus as claimed in claim 5 in which said followers are provided with recessed guide tracks for receiving said rollers.

7. The apparatus as claimed in claim 6 in which the recesses in the guide tracks are so disposed that a recessed area of one track is located opposite a non-recessed area of the other track.

8. The apparatus as claimed in claim 7 in which the recessed areas in one track are of different widths.

9. The apparatus as claimed in claim 8 in which the recessed areas in one track increase in size in a direction from one side toward the center and the recessed areas in the other track decrease in size in a direction from the same side toward the center.

10. The apparatus as claimed in claim 9 in which the width of the smallest recessed area corresponds to the width of a roller and each subsequent recessed area is greater by one roller width than the preceeding recessed area.

References Cited

UNITED STATES PATENTS 3,218,897  11/1965  Geigenmiller et al. __ 271—64 XR

EVON C. BLUNK, *Primary Examiner.*

ROBERT J. HICKEY, *Assistant Examiner.*